United States Patent Office 3,756,967
Patented Sept. 4, 1973

3,756,967
POLY(VINYL CHLORIDE) HOMOPOLYMER
PARTICLES OBTAINED BY FREEZE-DRYING
Harmon L. Liebman and Shirley A. Liebman, Lancaster, Pa., asssignors to Armstrong Cork Company, Lancaster, Pa.
No Drawing. Filed Dec. 8, 1971, Ser. No. 206,132
Int. Cl. C08j 1/30
U.S. Cl. 260—2.5 B        5 Claims

ABSTRACT OF THE DISCLOSURE

Particles of poly(vinyl chloride) homopolymers having increased porosity are obtained by freeze-drying suspension or bulk polymerized poly(vinyl chloride) homopolymer particles thus minimizing significant heat history during particle formation.

DESCRIPTION OF THE PRIOR ART

U.S. Pat. No. 2,800,463 discloses methods for preparing emulsion polymerized poly(vinyl acetate) to obtain the poly(vinyl acetate) in powder form and includes a disclosure of freeze-drying a conventional aqueous poly(vinyl acetate) emulsion. It is also known that poly(vinyl chloride) particles, having a porous and granular form for easy processability, may be prepared by suspension and bulk polymerization techniques. Particles of such poly(vinyl chloride) resins are known to be more porous than those prepared by the emulsion process and are somewhat analogous to open-cell sponges.

SUMMARY OF THE INVENTION

We have found that particles of poly(vinyl chloride) homopolymer resins may be readily converted into a powder form wherein the particles exhibit high porosity, by subjecting particles formed from suspension or bulk polymerization to a freeze-dry technique. A water slurry of the particles formed by bulk or suspension polymerization is utilized, the solvent utilized in the bulk polymerization being first removed after which the bulk polymerized particles are reconstituted as a water slurry. Other liquids which are a nonsolvent for the polymer may be used. Various freeze-dry techniques may then be utilized to form the powdered resin having a high porosity and a lower bulk density in which there is a significant average particle size increase, and the process may be controlled to vary the particle size by controlling the conditions of polymerization and the varying conditions of the freeze-dry process.

DESCRIPTION OF THE PREFERRED EMBODIMENT

Preparation of suspension polymerized PVC resins A and B

Two poly(vinyl chloride) homopolymer resin batches were prepared as follows:

The suspending system was prepared by dissolving 0.3 gram of sodium lauryl sulfate in 155 grams of deionized water. This solution was then heated to 158° F. and 0.6 gram of hydroxy-methyl cellulose (4000 cps.) was blended into the solution with agitation. Mixing was continued until all of the particles were thoroughly wetted. The mixture was cooled to 140° F. and 150 grams of deionized water was added in the form of 50% by weight ice and 50% by weight cold water. The mixture was stirred until the temperature dropped to about 65° F. with clarity being attained at 68-75° F.

The clarified suspension solution was then added to a 26-ounce glass reactor bottle. 0.6 gram of azobis-isobutyronitrile was added, and the mixture cooled in a freezer at −10° C. until ice formation was initiated. 155 grams of (liquid) vinyl chloride was added, and a 5 gram portion was allowed to evaporate to purge the bottle of air. The bottle was capped and allowed to attain room temperature. The bottle was placed in a constant temperature oil bath at 50° C. for 16 hours and rotated at about 40 r.p.m. The bottle was then removed from the bath, cooled to room temperature, and the top vented to allow excess vinyl chloride gas to escape. The slurry was filtered and washed with successive washings of deionized water and a 20% methanol-water solution to remove unwanted additives.

Two 800 gram batches of poly(vinyl chloride) homopolymer resin designated Resin A and Resin B were prepared by this procedure.

For purposes of evaluating the freeze-dry technique for forming particles of poly(vinyl chloride) homopolymer resins of high porosity, aqueous (50% water) slurries of poly(vinyl chloride) particles of Resins A and B were frozen in a flatbed into a slab, ground into frozen particles which were placed on platens and vacuum freeze-dried in a Stokes 24 square-foot freeze-drier. The pressure was held in the range of 500–200$\mu$ Hg, and the temperature was held at about 35° C. (it was not allowed to exceed 40° C.). At the end of a 24-hour batch cycle, the vacuum was broken with nitrogen and the white, free-flowing powdered polymer packed in nitrogen flushed sealed cans.

The white, free-flowing powdered polymer was found to have the following characteristics:

Tacticity

Resins A and B have 45% syndio- and 55% isotactic content as determined by nuclear magnetic resonance analysis and were essentially identical to commercial Diamond 450 PVC or Exon 965.

Molecular weight distribution (determined by gel permeation chromatography)

Resin A—$M_n$ equals 47,000; $M_w$ equals 104,000; $M_w/M_n$ equals 2.2; $M_z/M_n$ equals 1.95.

Resin B—$M_n$ equals 29,400; $M_w$ equals 73,900; $M_w/M_n$ equals 2.52; $M_z/M_n$ equals 1.76.

When compared to values for Diamond 450 PVC (Diamond Shamrock Chemical Co.) which had representative values for $M_n$ of 45,000; $M_w$ of 89,500 and $M_n/M_w$ of 1.98 and when compared to values for Exon 965 (Firestone Plastics Co.) which had representative values for $M_n$ of 24,600; $M_w$ of 48,600 and $M_w/M_n$ of 1.98, Resins A and B were found to be in the low to medium molecular weight range, and comparisons with commercially available polymers were made within such ranges.

Glass transition temperature

The glass transition temperature ($T_g$) was determined by differential scanning caloriometry and found essentially similar to commercial poly(vinyl chloride) homopolymer. It was found that Resins A and B had a $T_g$ of 80° C. and that the Diamond 450 PVC had a $T_g$ of 81° C. Thermal stability measured by thermogravimetric analysis showed similar parameters to those of the Diamond 450 PVC and Exon 965.

Bulk density (loosely packed)

This property was found to be variable and dependent upon the process conditions but was generally shown to be lower than commercially available PVC homopolymers. Thus Exon 965 had a bulk density of 0.60 gram/cc. whereas the freeze-dried poly(vinyl chloride) homopolymer Resins A and B had loosely packed bulk densities of less than 0.5 gram/cc.

Particle size

Sieve analysis showed approximately 97% of the freeze-dried poly(vinyl chloride) homopolymer particles of Resins A and B in the powdered form were retained on a 100-mesh screen. Photomicrographs showed significant average particle size increase relative to that seen with Diamond 450 powder and Exon 965.

Melt rheology

Measurement at four different shear rates (4 to 42/sec.) at approximately 150° C. and 160° C. gave apparent viscosities ranging from 1,898,000 to 252,00 poises for resin A. These values are similar to those of other comparable PVC homopolymers, but it was noted that values could be obtained at 150° C. for the freeze-dried polymer whereas for the Diamond 450 resin it is not readily measured under similar experimental conditions, a temperature of 166° C. being required. Some shear stress and fracturing was noted at these low temperatures for the freeze-dried polymer, but these parameters may be adjusted by suitable means such as plasticizer incorporation, increased temperature or a lower shear rate.

Porosity

Tests were conducted with a Porosimeter which indicated a significant increase in penetration volume relative to commercial PVC polymers. Thus, for freeze-dried poly(vinyl chloride) homopolymer resins A and B, a porosity of 0.12 cc. and 0.06 cc. were measured, respectively. With commercially available Diamond 450 resin and Exon 965 resin, porosities of 0.03 and 0.04 cc. respectively were determined.

Chlorination

Photochlorination and carbon tetrachloride suspension was performed on the freeze-dried PVC polymer, and a 75% total chlorine content resulted which was higher than the total chlorine content achieved with the Diamond 450 polymer treated in the same manner.

Reconstitution with dye

A water-dispersible dye. Resolin Brilliant Pink PRR (Verona Dyestuffs) in a 1% solution was used to reconstitute the freeze-dry powder (Resin A and B) and, after air drying, resulted in darker sample particles for equal weights of dye solution/gram PVC as compared to Diamond 450 PVC.

Dryblending behavior

Reconstitution of the freeze-dried powder (Resin A or B) with dioctylphthalate plasticizer according to the usual dryblending techniques [1] and evaluation according to the rheological properties of the blend at the transition and melt temperatures gave the following data:

|  | Viscosity (transition) | Viscosity (melt) |
|---|---|---|
| 135 C: | | |
| PVC dia. 450 | $11.7 \times 10^4$ poise | $6.6 \times 10^4$ poise. |
| Freeze-dried PVC | $9.3 \times 10^4$ poise | $5.0 \times 10^4$ poise. |
| 150 C: | | |
| PVC dia. 450 | $10.3 \times 10^4$ poise | $5.4 \times 10^4$ poise. |
| Freeze-dried PVC | $7.3 \times 10^4$ poise | $4.0 \times 10^4$ poise. |

The lower viscosity value is attained by the freeze-dried polymer and indicates increased efficiency in plasticizer incorporation. Also, according to a standard empirical method (ASTM D-1755-66), the total plasticizer sorption attainable to maintain a free-flowing powder was

[1] Poly(vinyl chloride) homopolymer resin was added to a Henschel blender and mixed at 1,800 r.p.m. until a temperature of approximately 135° F. was obtained, at which time the liquid plasticizer (at room temperature) was slowly added and mixing at 3,400 r.p.m. was continued until a final temperature of 210° F. was obtained.

compared for the samples: Exon 965=ca. 65 phr. DOP; Diamond 450=ca. 60–70 hr. DOP; freeze-dried PVC A and B=ca. 90–100 phr. DOP; i.e., the latter samples had significant increase in total plasticizer sorption and were similar to a low molecular weight dryblending resin, Exon 9290.

While we have described a method in which an aqueous slurry of suspension polymerized particles of poly(vinyl chloride) homopolymer resin has initially been flat frozen into slabs and then ground into particles which were vacuum freeze-dried in a freeze-drier, it is possible to prefreeze the slurries by immersion freezing to form small particles using a gas or liquid such as Freon as a refrigerant. Also, the slurries may be frozen by mixing droplets with powdered carbon dioxide or by expanding liquid carbon dioxide or other liquified gas such as nitrogen to freeze the droplets of slurry into puffed structures.

We have described a freeze-drying technique wherein a standard food-type batch freeze-drier is utilized, although it is readily evident that continuous freeze-dry equipment now available could be utilized advantageously. The drying of the poly(vinyl chloride) at greater than indicated total pressures would result in the additional advantages of additional convective heating at low temperatures and accelerated water removal. Also, vibration and increased conduction methods or decreasing product weight/heating surface ratios would aid in the process. More significantly, using temperatures just below the glass transition temperature of the polymer (about 70° C.) rather than 30° C. would allow accelerated drying rates and better economics. Other methods of optimizing the process will be readily evident to those skilled in the freeze-drying art.

The freeze-dried polymer particles may be packaged as is, and it is not necessary to package them as described in a gas-purged hermetically sealed container.

The dryblended resin composites find typical applications as, for instance, binder systems for resilient floor products. The dryblending behavior of the freeze-dried polymer is significantly better than commercially available dryblending resins, the lower viscosities achieved showing more complete plasticizer sorption.

We claim:
1. The method of forming porous particles of poly(vinyl chloride) homopolymer comprising:
   (A) initially forming the particles of poly(vinyl chloride) homopolymer by means of suspension or bulk polymerization techniques,
   (B) dispersing the particles thus formed in water, and
   (C) freeze-drying the particles of poly(vinyl chloride) homopolymer by freezing the dispersion and subliming the water under reduced pressure while maintaining the particles at a temperature less than the glass transition temperature of the poly(vinyl chloride) homopolymer.

2. The method of claim 1 wherein the particles are initially formed by suspension polymerization in an aqueous medium and wherein they are maintained in an aqueous dispersion.

3. A method in accordance with claim 1 wherein the PVC particles produced have no thermal history above the glass transition temperature of the poly(vinyl chloride) homopolymer.

4. A method in accordance with claim 2 wherein the PVC particles produced have no thermal history above the glass transition temperature of the poly(vinyl chloride) homopolymer.

5. The method in accordance with claim 1 wherein the poly(vinyl chloride) homopolymers are initially obtained by bulk polymerization and wherein they are separated from the bulk polymerization medium and redispersed in an aqueous slurry.

(References on following page)

References Cited

UNITED STATES PATENTS

| | | | |
|---|---|---|---|
| 2,674,593 | 4/1954 | Condo et al. | 260—92.8 A |
| 3,238,172 | 3/1966 | Talalay et al. | 260—2.5 L |
| 2,800,463 | 7/1957 | Morrison | 260—874 |

PAUL LIEBERMAN, Primary Examiner

M. FOELAK, Assistant Examiner

U.S. Cl. X.R.

260—2.5 P, 2.5 R, 29.6 PT, 92.8 A, D16.22